United States Patent
Wilson (10) Patent No.: US 9,692,914 B2
(45) Date of Patent: *Jun. 27, 2017

(54) DEVICES AND METHOD FOR TAGGING MEDIA

(71) Applicant: AT&T Mobility II LLC, Atlanta, GA (US)

(72) Inventor: Alasha Wilson, Oklahoma City, OK (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/268,855

(22) Filed: Sep. 19, 2016

(65) Prior Publication Data

US 2017/0006168 A1  Jan. 5, 2017

Related U.S. Application Data

(63) Continuation of application No. 12/963,790, filed on Dec. 9, 2010, now Pat. No. 9,451,499.

(51) Int. Cl.
*H04M 15/00* (2006.01)
*H04W 4/02* (2009.01)
(Continued)

(52) U.S. Cl.
CPC ... *H04M 15/8271* (2013.01); *H04M 3/42017* (2013.01); *H04W 4/02* (2013.01);
(Continued)

(58) Field of Classification Search
USPC ............. 707/758; 379/142.01; 709/203, 206, 709/217, 219, 223, 224, 226, 228, 231,
(Continued)

(56) References Cited

U.S. PATENT DOCUMENTS 7,761,816 B2   7/2010   Goldfarb
8,106,887 B2   1/2012   Park et al.
(Continued)

OTHER PUBLICATIONS

U.S. Office Action dated Dec. 26, 2012 in U.S. Appl. No. 12/963,790.
(Continued)

*Primary Examiner* — Quang N Nguyen
(74) *Attorney, Agent, or Firm* — Hartman & Citrin LLC (57) ABSTRACT

Technologies relating to tagging and receiving media on a mobile communication device are disclosed. A mobile communication device is equipped with tag logic allowing the user to tag media objects that are observed and/or desired by the user. The outputted tag includes a media reference and a user identification. When the mobile communication device outputs a media object, the user tags the media object by entering a command, hitting a button, entering a key sequence, etc. The tag is transmitted from the mobile communication device to a media server over a network. Once the media server receives the tag, the media server locates the media object in a media database using the media reference and sends the media object through the network to the mobile communication device. The media server notifies a billing server of the tag and the user is billed for the downloaded media object.

20 Claims, 5 Drawing Sheets

(51) Int. Cl.
  *H04W 88/06* (2009.01)
  *H04W 28/08* (2009.01)
  *H04M 3/42* (2006.01)
  *H04W 4/24* (2009.01)
  *H04W 72/04* (2009.01)

(52) U.S. Cl.
  CPC ............ *H04W 4/24* (2013.01); *H04W 28/08* (2013.01); *H04W 72/0413* (2013.01); *H04W 88/06* (2013.01)

(58) Field of Classification Search
  USPC .......................................................... 709/232
  See application file for complete search history.

(56) References Cited

U.S. PATENT DOCUMENTS

| | | | |
|---|---|---|---|
| 8,151,178 | B2 | 4/2012 | Ross et al. |
| 8,160,220 | B2 | 4/2012 | Pfleging et al. |
| 8,239,769 | B2 * | 8/2012 | Ruiz-Velasco ......... G06Q 30/06 707/758 |
| 8,600,369 | B2 | 12/2013 | Tong et al. |
| 8,688,991 | B1 | 4/2014 | Sunil |
| 8,977,249 | B2 * | 3/2015 | Sarkar .................... H04M 3/02 379/142.01 |
| 2002/0183042 | A1 | 12/2002 | Thornton |
| 2004/0044774 | A1 | 3/2004 | Mangalik |
| 2004/0114732 | A1 | 6/2004 | Choe et al. |
| 2006/0095323 | A1 | 5/2006 | Muranami |
| 2007/0010195 | A1 | 1/2007 | Brown |
| 2008/0011825 | A1 | 1/2008 | Giordano |
| 2008/0167968 | A1 | 7/2008 | Cue et al. |
| 2009/0005079 | A1 | 1/2009 | Shields |
| 2009/0077046 | A1 | 3/2009 | Narahara |
| 2009/0128335 | A1 | 5/2009 | Leung |
| 2010/0077017 | A1 | 3/2010 | Martinez et al. |
| 2010/0233997 | A1 | 9/2010 | Hou |
| 2010/0304735 | A1 | 12/2010 | Hursey et al. |
| 2011/0092191 | A1 | 4/2011 | Inapakolla et al. |
| 2012/0309369 | A1 | 12/2012 | Inapakolla |

OTHER PUBLICATIONS

U.S. Office Action dated Jul. 18, 2013 in U.S. Appl. No. 12/963,790.
U.S. Office Action dated May 7, 2014 in U.S. Appl. No. 12/963,790.
U.S. Office Action dated Dec. 12, 2014 in U.S. Appl. No. 12/963,790.
U.S. Office Action dated Nov. 4, 2015 in U.S. Appl. No. 12/963,790.
U.S. Notice of Allowance dated Apr. 14, 2016 in U.S. Appl. No. 12/963,790.

* cited by examiner

DEVICES AND METHOD FOR TAGGING MEDIA

CROSS-REFERENCE TO RELATED APPLICATIONS

This application is a continuation of and claims priority to U.S. patent application ser. No. 12/963,790, entitled "Devices and Method for Tagging Media," filed Dec. 9, 2010, now U.S. Pat. No. 9,451,499, which is incorporated herein by reference in its entirety. now allowed, which is incorporated herein by reference in its entirety.

BACKGROUND

Field of the Subject Disclosure

The present subject disclosure relates to tagging media. More specifically, the present subject disclosure relates to tagging and receiving media through a network on a mobile communication device.

Background of the Subject Disclosure

Mobile communication devices, such as cellular phones, have become a common tool of everyday life. Cellular telephones are no longer used simply to place telephone calls. With the number of available features rapidly increasing, cellular telephones are now used for storing addresses, keeping a calendar, reading e-mails, drafting documents, etc. These devices are small enough that they can be carried in a pocket or purse all day, allowing a user to stay in contact almost anywhere. Recent devices have become highly functional, providing applications useful to business professionals as well as the casual user.

Today, there exist wireless devices that are capable of entertainment as well as work. Many mobile communication devices store and play music and videos. Increased storage capacity and processing power enable users to store entire music collections and/or play entire movies. Users can play interactive games on these mobile communication devices as well.

As these mobile communication devices increase in popularity, users become more familiar with the selection of media and games available. Manufacturers, vendors, and service providers strive to provide users with a convenient method of obtaining new media and games. iTunes is a popular online service which sells media and games through a user's personal computer. Once on the personal computer, these media and games can be transferred to a mobile communication device. Service providers have placed media stores right on the mobile communication device. Users browse, purchase, and download media directly through their mobile communication device.

Marketplaces making media and applications available to everyone are generally ubiquitous. However, there are many occasions where a user hears a song or sees a movie, but is unable to purchase the item. For example, a user who calls another mobile communications device may hear a ringback-tone playing until the other side answers. If the user likes that song, then they may want to purchase it. However, at best, the user must wait until the end of the conversation to purchase, and at worst, the user doesn't know enough information about the song to find it at the online store. In another example, a user may see a video or game on another user's mobile communications device, but lacks time to find the media.

What is needed in the art is a way for the user to easily purchase media as soon as they experience it.

SUMMARY

The present subject disclosure includes devices, systems, and methods for tagging and receiving media through a mobile communication device. In exemplary embodiments, a mobile communication device is equipped with tag logic allowing the user to tag media objects that are output using media references and user identification. When the mobile communication device outputs a media object, the user tags the media object by entering a command, hitting a button, entering a key sequence, etc. The tag includes a media reference, and a user identifier. The tag is sent from the mobile communication device through a network to a media server. Once the media server receives the tag, the media server locates the media object in a media database using the media reference. The media server then sends the media object through the network to the mobile communication device. The media server notifies a billing server of the tag, and the user is billed for the downloaded media object.

In one exemplary embodiment, the present subject disclosure is a mobile communication device. The mobile communication device includes a processor, a memory in communication with the processor, a transceiver in communication with the processor, a tag logic on the memory for receiving input to create a tag for a media object, the tag including a media reference and a user ID, sending the tag to a media server, and receiving the media object from the media database.

In another exemplary embodiment, the present subject disclosure is a system for tagging and receiving media on a mobile communication device. The system includes a mobile communication device, a media server in communication with the mobile communication device, a media database in communication with the mobile communication device, a billing server in communication with the media server, a tag logic on the mobile communication device for receiving input to create a tag for a media object, the tag including a media reference and a user ID, sending the tag to a media server, and receiving the media object from the media database, and a media logic on the media server for receiving the tag from the mobile communication device, sending the media object to the mobile communication device, and sending a record of the media tag to the billing server.

In yet another exemplary embodiment, the present subject disclosure is a method for tagging and receiving media on a mobile communication device. The method includes receiving input to create a tag for a media object, the tag including a media reference and a user ID, sending the tag to a media server, and receiving the media object from the media database.

DETAILED DESCRIPTION

The present subject disclosure includes devices, systems, and methods for tagging and receiving media through a mobile communication device. In exemplary embodiments, a mobile communication device is programmed with tag logic enabling a user to tag media objects that are output using media references and user identification. When the mobile communication device outputs a media object, the user tags the media object via an interface provided by the tag logic. The user tags the media object by entering a command, hitting a button, entering a key sequence, etc. The tag includes a media reference, and a user identifier. The tag is transmitted from the mobile communication device through a network to a media server. Upon receiving the tag, the media server locates the media object in a media database using the media reference included in the tag. The media server then transmits the media object through the network to the mobile communication device. The media server additionally notifies a billing server of the receipt of the tag, and the user is subsequently billed for the tagged media object.

A "media object," as used herein and throughout this disclosure, is any digital multimedia or software application including pictures, sounds, videos, games, etc., in whole or in part. A "media reference," as used herein and throughout this disclosure, is any available information that identifies one of a plurality of specific attributes of a media object. For instance, a media reference may include one or a combination of a song title and artist, a date and time the media object was played, a hash of the underlying code of the media object, etc. Media references may take different forms depending on the available information.

"Mobile communication device," as used herein and throughout this disclosure, refers to any electronic device capable of wirelessly sending and receiving data. A mobile communication device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic," as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a telecommunication network, logic may be programmed on a server, or a complex of servers. A particular logic unit is not limited to a single logical location on the telecommunication network.

Mobile communication devices communicate with each other and with other elements via a network, for instance, a wireless network, or a wireline network. A "network" can include broadband wide-area networks such as cellular networks, local-area networks (LAN), and personal area networks, such as near-field communication (NFC) networks including BLUETOOTH. Communication across a network is preferably packet-based; however, radio and frequency/amplitude modulations networks can enable communication between mobile communication devices using appropriate analog-digital-analog converters and other elements. Communication is enabled by hardware elements called "transceivers." Mobile communication devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH transceiver for communicating with a BLUETOOTH device. A network typically includes a plurality of elements that host logic for performing tasks on the network.

For the following description, it can be assumed that most correspondingly labeled structures across the figures (e.g., 113 and 213, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figures 1A, 1B:
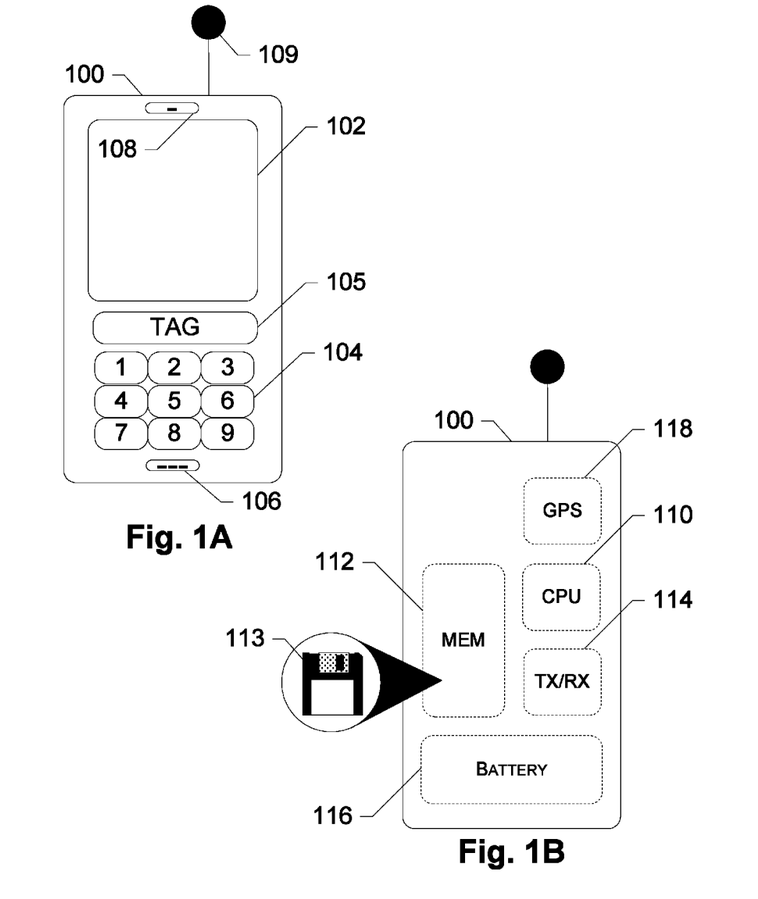
FIG. 1A shows a mobile communication device, according to an exemplary embodiment of the present subject disclosure.
FIG. 1B shows the inner components of a mobile communication device, according to an exemplary embodiment of the present subject disclosure.

FIG. 1A shows a mobile communication device 100, according to an exemplary embodiment of the present subject disclosure. Mobile communication device 100 includes a display 102, a keypad 104 including a tag key 105, a microphone 106, a speaker 108, and an antenna 109. Display 102 is a liquid crystal display (LCD) which serves as a visual output for the user. Keypad 104 is an input for entering information and commands to mobile communication device 100. Tag key 105 is a key on keypad 104 that executes tag logic as discussed below. Microphone 106 accepts aural input and allows mobile communication device 100 to deliver voice communication to the network and other mobile communication devices. Speaker 108 outputs audio for the user to hear. Antenna 109 sends and receives wireless radiofrequency (RF) signals to and from wireless networks and other wireless devices.

FIG. 1B shows the inner components of a mobile communication device 100, according to an exemplary embodiment of the present subject disclosure. The inner components of mobile communication device 100 include a processor 110, a memory 112 including a tag logic 113, a transceiver 114, a battery 116, and a GPS unit 118. Processor 110 receives input and issues commands to deliver output through the other components. Memory 112 holds information for enabling processor 110 to operate the other components of mobile communication device 100, and contains tag logic 113. Tag logic 113 generates tags upon a command input by a user. A tag includes a media reference corresponding to a media object, and a user identification unique to the user of mobile communication device 100. Once a tag is created, the tag logic 113 transmits the tag to a media server across a mobile network via transceiver 114 and antenna 109. The tag logic 113 further receives a media object from the network, the media object referenced in the media reference, and stores the media object in memory 112. Transceiver 114 converts wireless signals received by antenna 109 to information capable of processing by processor 110, and vice-versa. Transceiver 114 can use one or more wireless protocols, including cellular RF, WiFi, BLUETOOTH, etc., to communicate with the network and other mobile communication devices. Battery 116 powers mobile communication device 100. GPS unit 118 is a global locator for mobile communication device 100. GPS Unit 118 determines the position of mobile communication device by communicating with satellites, and includes regular GPS as well as Assisted GPS (AGPS) features.

There are many embodiments of a mobile communication device that are capable of being equipped with the present subject disclosure. For instance, many legacy model cellular telephones are capable of executing the tag logic described above. The tag key 105 of FIG. 1A is substantially for convenience. In other embodiments, a user can execute a tag command by pressing any key or combination of keys. Other forms of command input trigger the tag logic in further embodiments, such as voice input through a microphone, tactile input through a touch screen, movement sensed by an accelerometer, visual input through a camera, etc.

In other embodiments of the mobile communication device 100, other displays are used, such as an LED display, OLED display, etc. In some embodiments, the display 102 is used as a touch-sensitive input device, i.e. a touch screen. A touch screen allows the user to view output on the display 102 as well as use the display 102 to provide input. In some touch screen embodiments, the mobile communication device 100 may not have a physical keypad 104 for input. Instead, a virtual keypad is displayed on the touch screen and the user inputs by touching the virtual keys. Other forms of input such as full keyboards, accelerometers, motion sensors, etc., can be utilized in the mobile communication device 100. The memory 112 can be a non-removable internal memory, or a removable memory such as in a subscriber identity module (SIM) card or a memory card inserted into a memory card reader. Many mobile communication devices have more than one transceiver 114 or a transceiver 114 that supports more than one protocol. For instance, it is not uncommon for a mobile communication device 100 to support cellular radio frequency (RF), WiFi, and BLUETOOTH protocols. Embodiments of the mobile communication device 100 include RFID or smartcard readers as well.

Figure 2:
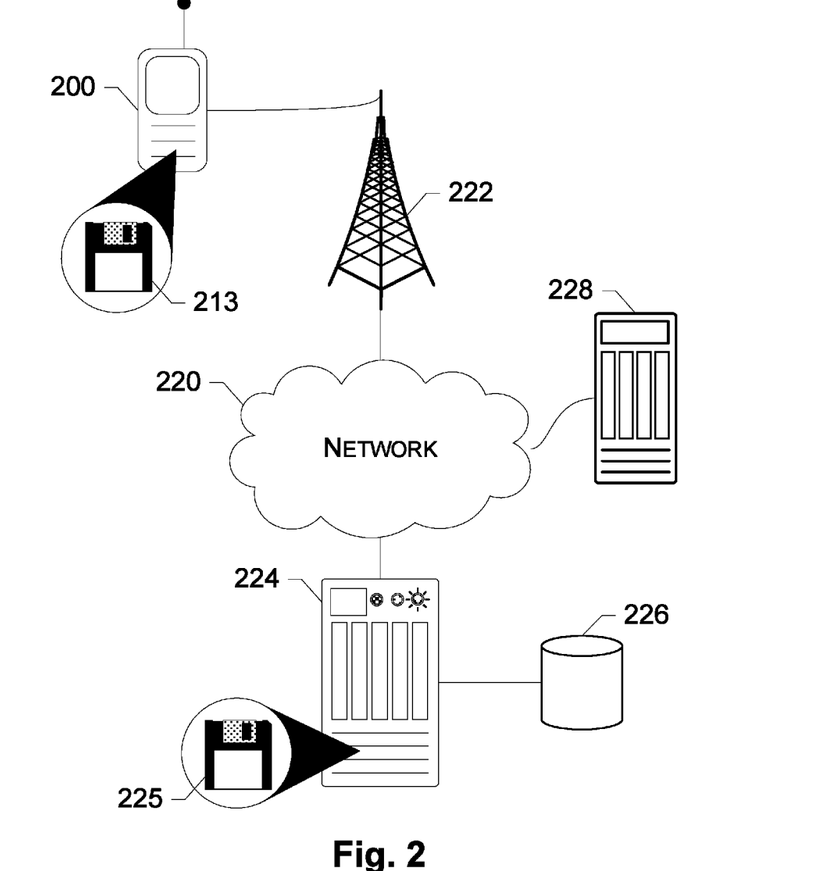
FIG. 2 shows a system for tagging and receiving media, according to an exemplary embodiment of the present subject disclosure.

FIG. 2 shows a system for tagging and receiving media, according to an exemplary embodiment of the present subject disclosure. The system includes a mobile communication device 200 having tag logic 213 stored on a memory therein, a base station 222, a network 220, a media server 224 having media logic 225 stored on a memory therein, a media database 226, and a billing server 228. Mobile communication device 200 connects to network 220 through base station 222 wirelessly, and base station 222 relays the communication to other elements on network 220. Network 220 is in communication with media server 224 and billing server 228. Media server 224 is further in communication with media database 226. Various methods may be used to enable communication between network elements. For instance, base station 222 includes or is part of a radio network including radio network controllers, gateways, etc. Network 220 is representative of a plurality of different types of network communicating with each other, such as radio networks, mobile networks, data networks, the Internet, and so on. Consequently, an IP-enabled mobile communication device 200 would be able to communicate directly with servers 224 and 228. Further, in an IP Multimedia System, each network entity has a unique address, and direct connections are possible between one or more network entities in order to transmit and receive media tags, stream/download media objects, etc. In some embodiments, the media database 226 is connected directly to the network 220. Thus, the goals of the system can be achieved by connecting these components in various ways.

In operation, a user of mobile communication device 200 experiences or encounters a media object that he desires to acquire. For instance, the user browses a web site using his mobile device, and stumbles upon a video or audio object. Instead of manually having to track down a download link, or go through a purchasing screen/interface, the user simply tags the object using a simple input on mobile communication device 200. Tag logic 213 generates the tag in response to the input, the tag including a reference to the media object, and a unique identifier of the user, and transmits the tag to media server 224. Media logic 225, on media server 224, receives the tag and parses the contents of the tag to determine the media reference and the user identifier. Since the media reference may be any of a song title and artist, a date and time the media object was played, a hash of the underlying code of the media object, etc., the media logic must determine which media object in media database 226 the user has tagged. This determination depends on the type of media reference. A query of media database 226 is sufficient for media references based on a song title, artist, and hash. For media references based on last played date, time, etc., a call log or other time table of records may be queried. Media database 226 returns one or more search results, and a closest match is selected as the corresponding media object. Once the media object is determined, the media object is transmitted from media database 226 through network 220 to mobile communication device 200. Either the closest match is transmitted, or the user is presented with a plurality of close matches, upon which the user can select the desired media object. Once the media object is acquired by the user or transmitted to mobile communication device 200, media server 224 transmits a notice to billing server 228, the notice including the user identifier and the media reference. An amount may be included in the notice. Alternatively, the billing server 228 refers to a separate database of prices / amounts when billing the user. The media object may be added to a monthly bill for the user, with the billing actually occurring at a later date.

Figure 3:
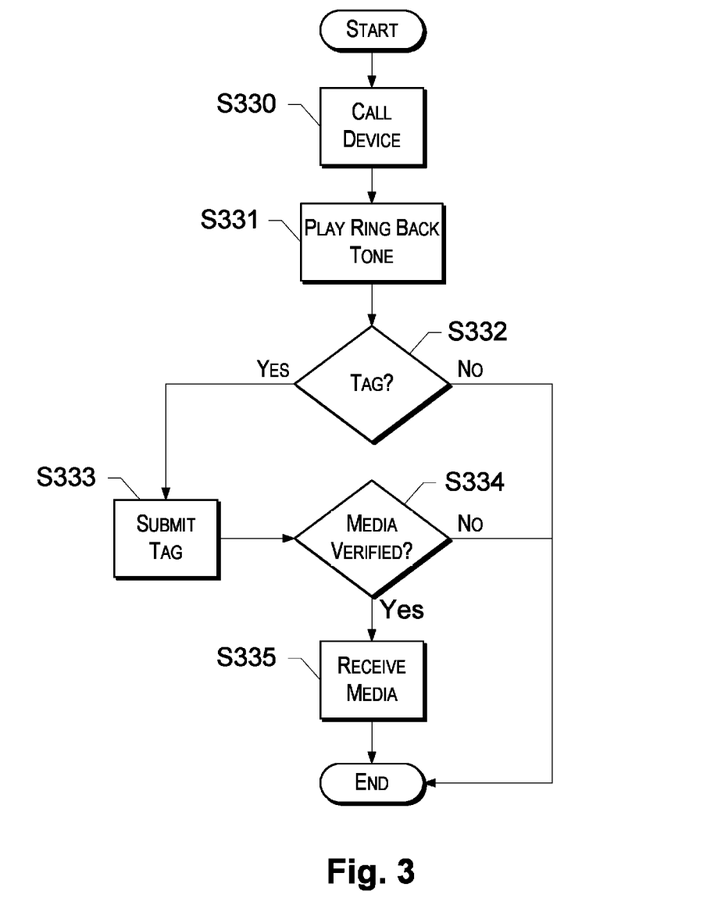
FIG. 3 shows a flowchart for tagging and receiving media, according to an exemplary embodiment of the present subject disclosure.

FIG. 3 shows a method for tagging and receiving media, according to an exemplary embodiment of the present subject disclosure. In this exemplary embodiment, a call is placed from a calling mobile communication device to a called mobile communication device (S330). As the user of the calling mobile communication device waits for an answer, the user hears a ring-back-tone being played of the latest hit song (S331). The user likes this song, and decides to tag the song (S332). The user tags the song by pressing a dedicated "TAG" button, entering a key sequence, etc. Tag logic on the calling mobile communication device generates a tag including a media reference associated with the song and a user identifier, and transmits the tag through the network to the media server (S333). The media server searches a media database using the media reference to determine the closest match. In this exemplary embodiment, the media server verifies with the user that the closest match is identical to the media object referenced in the tag (S334). In this embodiment, the user receives a telephone call on their mobile device, and the media object is played for the user. The user hears the latest hit song once again, and enters a key to verify the media object. Once verified, the media object is sent through the network to the mobile communication device (S335). Other means of verifying the media object with a user will become apparent to a person having ordinary skill in the art in light of this disclosure.

After hitting the "TAG" button, the called mobile communication device may answer the call. In this case, the media server will wait until the call is completed to verify the media object. Transmission of the tag to the media server generally occurs through the network. The tag can be transmitted using a control channel, a Short Message Service (SMS) message, an email, etc., depending on the embodiment. In some embodiments, the mobile communication device emits Dual-Tone Multi-Frequency (DTMF) tones that the media server receives and parses to determine the media reference and the user identifier. The user receives a call to verify an audible media object, such as a song. The user verifies by hitting a key on the keypad, or using some other form of input. The verification can be sent using a control channel, SMS, email, or any of the methods used to tag the media object. Other types of media objects require different forms of verification. To verify a game or application, a picture of the game or application is sent to the mobile communication device. The image can be sent by a control channel, SMS, email, etc. The user may verify by sending a reply or using any of the methods for sending a tag. Different media objects may require different forms of verification, which will become readily recognizable by those having skill in the art, upon reading this disclosure.

Figure 4:
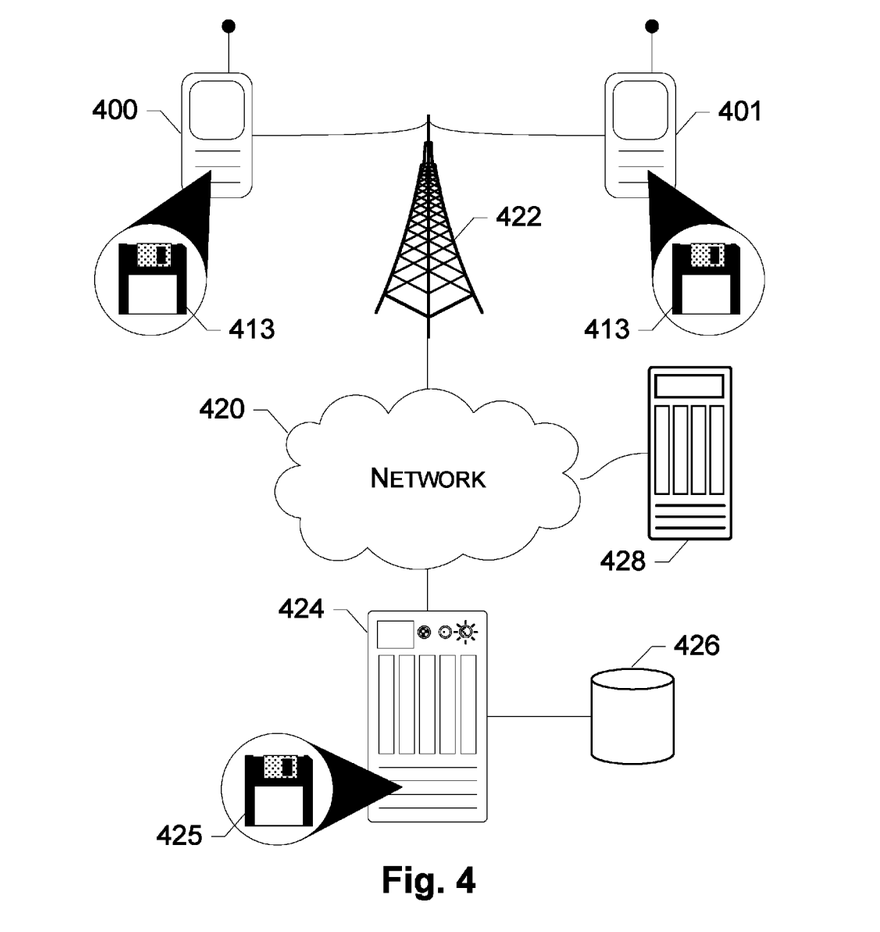
FIG. 4 shows another system for tagging and receiving media, according to an exemplary embodiment of the present subject disclosure.

FIG. 4 shows another system for tagging and receiving media, according to an exemplary embodiment of the present subject disclosure. This system includes a mobile communication device 400 having stored within an onboard memory a tag logic 413, a base station 422, a second mobile communication device 401 also having tag logic 413, a network 420, a media server 424 having media logic 425, a media database 426, and a billing server 428. Mobile communication device 400 and mobile communication device 401 wirelessly connect to network 420 through base station 422, which relays the communication to network elements on network 420. Network 420 is in communication with media server 424 and billing server 428. Media server 424 is equipped with media logic 425 and is further in communication with media database 426. As in the system of FIG. 2, various methods may be used to enable communication between network elements such as IP networking, etc. Further, other components are not shown but will be known to one skilled in the art, such as radio network controllers, gateways, etc.

When a user of mobile communication device 400 is near mobile communication device 401, the user of the mobile communication device 400 sees, admires, and consequently desires to own for himself a media object displayed or being played on mobile communication device 401. Using tag logic 413, mobile communication device 400 searches for nearby mobile communication devices using GPS. The GPS coordinates of mobile communication device 400 are compared with GPS coordinates of other mobile communication devices, and mobile communication device 401 is found. To enable this, owner of mobile communication device 401 may subscribe to a service on the network that allows sharing of GPS coordinate information, such communities being in existence today. Tag logic 413 allows the user of mobile communication device 400 to browse the media objects of mobile communication device 401 by entering a password on mobile communication device 400. Once the user finds the desired media object, the user tags the media object using any of the methods described above. Tag logic 413 of mobile communication device 400 generates a tag including a media reference and a user identifier, and transmits the tag to media server 424 across network 420. Media logic 425, on media server 424, parses the tag to extract the media reference and the user identifier. Media logic 425 then determines which media object in media database 426 the user has tagged. Media database 426 returns one or several closely matched results based on the media reference. Media logic 425 determines the best media object and transmits the media object from media database 426 through network 420 to mobile communication device 400. Media server 424 then sends a notice to billing server 428, the notice including the user identifier and the media reference. An amount may be included in the notice.

In other embodiments, the mobile communication device determines nearby mobile communication devices using Near Field Communication (NFC), BLUETOOTH, WiFi, and other forms of wireless communication. This may occur after registering with a personal area network (PAN) or a local area network (LAN). The mobile communication device may additionally locate other mobile communication devices based on the cell ID of the base station, a serving mobile switching center (MSC), sector coordinates, etc. When connecting to another mobile communication device, the communication may be through the network or via a direct connection. Network congestion is relieved in embodiments where the mobile communication devices communicate directly through NFC, WiFi, BLUETOOTH, etc. There are many security measures that can be used to protect users from unauthorized access to media objects. A password, PIN, etc., can be given for general access, or on a per-user basis. Restrictions on time of access are enforced in some embodiments. Some mobile communication devices provide access to only some of the media objects stored on the memory while other media objects remain hidden. A special sharing folder may be created on some mobile devices to enable access to, preview of, and tagging of media objects.

Figure 5:
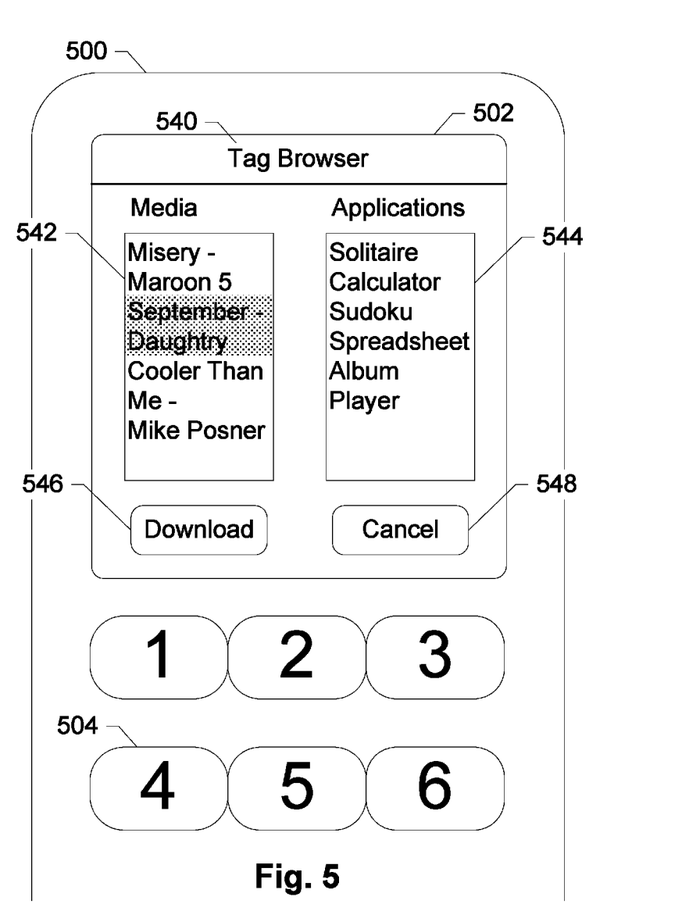
FIG. 5 shows a screenshot for tagging media from another mobile communication device, according to an exemplary embodiment of the present subject disclosure.

FIG. 5 shows a screenshot of a user interface for tagging media stored on another mobile communication device, according to an exemplary embodiment of the present subject disclosure. The screenshot is shown on display 502 of mobile communication device 500, which includes keypad 504, among other components. The user interface is generated and presented by a tag logic on a memory of mobile communication device 500 and includes a tag browser 540, a media selection 542, an application selection 544, a download button 546 and a cancel button 548. When mobile communication device 500 connects to a nearby mobile communication device, tag browser 540 loads to display the selection of media objects that are stored on the nearby mobile communication device and indicated as being available for the user to tag or download. Once the user has found a desired media object, the user selects the media object using keypad 504. Once selected, the user then selects the download button using keypad 504 once again. Once the download button has been selected, the tag is sent to the media server, and the transaction begins.

In other embodiments of the present subject disclosure, the tag logic allows the user to choose more options when browsing the media objects of another mobile communication device or other device on the network. Search functions allow users to quickly locate a specific media object and preview functions allow users to listen to or view a sample of the media object before tagging. The user may add the media object to a wish list, a list of media objects for future download stored on the memory of the browsing mobile communication device, in some embodiments. This allows the user to wait until a later time, and readily recall the media object when the user is ready to purchase.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

The invention claimed is:

1. A device comprising:
   a processor;
   a transceiver; and
   a memory that stores a tag logic that, when executed by the processor, causes the device to perform operations comprising
      playing, during a first telephone call, a ring-back tone that comprises a part of a song,
      receiving, during the first telephone call, a first input to create a tag for the ring-back tone played during the first telephone call, the tag comprising a media reference that corresponds to the song that is associated with the ring-back tone and a user identifier unique to a user,
      transmitting the tag to a media server to obtain a media object from the media server, wherein the media object comprises an audio file that matches the song that is identified by the media reference,
      after completion of the first telephone call, receiving, from the media server, a second telephone call,
      playing, during the second telephone call, the media object, wherein the media object is played to obtain a verification from the user that the media object matches the media reference,
      receiving, during the second telephone call, a second input that indicates that the media object matches the media reference and should be verified,
      in response to receiving the second input, sending the verification to the media server to verify the media object, and
      receiving the media object from the media server.

2. The device of claim 1, further comprising a keypad, wherein the first input comprises selection of a dedicated tag key included in the keypad.

3. The device of claim 1, further comprising a global positioning system unit.

4. The device of claim 3, wherein the tag logic, when executed by the processor, causes the device to perform operations further comprising:
   determining global positioning system coordinates of the device using the global positioning system unit;
   searching for a nearby device using the global positioning system coordinates;
   browsing media objects of the nearby device; and
   generating a second tag referencing one of a plurality of media objects of the nearby device to obtain a second media object, wherein the second media object comprises one of the plurality of media objects of the nearby device.

5. The device of claim 1, wherein transmitting the tag comprises transmitting the tag via a first short message service message, and wherein sending the verification comprises sending the verification via a second short message service message.

6. The device of claim 1, wherein transmitting the tag comprises transmitting the tag via a first email message, and wherein sending the verification comprises sending the verification via a second email message.

7. The device of claim 1, wherein the tag comprises a date the ring-back tone was played, a time the ring-back tone was played, and a hash.

8. The device of claim 1, wherein transmitting the tag comprises transmitting the tag over a control channel, and wherein sending the verification comprises sending the verification over the control channel.

9. A method comprising:
   playing, at a device that executes a tag logic and during a first telephone call, a ring-back tone that comprises a part of a song,
   receiving, by the device and during the first telephone call, a first input to create a tag for the ring-back tone played during the first telephone call, the tag comprising a media reference that corresponds to the song that is associated with the ring-back tone and a user identifier unique to a user associated with the device;
   transmitting, by the device, the tag to a media server to obtain a media object from the media server, wherein the media object comprises an audio file that matches the song that is identified by the media reference;
   receiving, by the device after termination of the first telephone call, a second telephone call;
   playing, by the device, the media object during the second telephone call to obtain a verification from the user that the media object matches the media reference;
   receiving, during the second telephone call, a second input that indicates that the media object matches the media reference and should be verified;
   in response to receiving the second input, sending, during the second telephone call, the verification from the device to the media server to verify the media object; and
   receiving, by the device, the media object from the media server.

10. The method of claim 9, further comprising outputting the media object.

11. The method of claim 9, further comprising connecting to a second device.

12. The method of claim 9, further comprising:
   determining, by the device, global positioning system coordinates of the device using a global positioning system unit;

searching, by the device, for a nearby device using the global positioning system coordinates;

browsing, by the device, media objects of the nearby device; and generating, by the device, a second tag to obtain a second media object, wherein the second media object comprises one of a plurality of media objects of the nearby device.

13. The method of claim 9, wherein receiving the first input comprises detecting selection of a dedicated tag key that is included in a keypad of the device.

14. A method comprising:

receiving, at a media server comprising a processor, a media reference and a user identifier, the user identifier being associated with a media object played during a first telephone call, and the user identifier being unique to a user associated with a device, wherein the media reference corresponds to a request to provide the media object from the media server to the device;

identifying, by the media server, a closest matching media object based upon the media reference, wherein the media server searches a plurality of media objects to identify the closest matching media object;

initiating, by the media server after termination of the first telephone call, a second telephone call to the device to verify that the closest matching media object matches the media reference;

playing, by the media server, the media object during the second telephone call;

receiving, by the media server and during the second telephone call, an indication from the device, wherein the indication corresponds to a verification that the closest matching media object matches the media reference; and providing, by the media server, the closest matching media object to the device in response to the verification.

15. The method of claim 14, further comprising notifying, by the media server, a billing server of receipt of the media reference.

16. The method of claim 14, further comprising, locating, by the media server, the closest matching media object in a media database.

17. The method of claim 14, further comprising parsing, by the media server, a tag to determine the closest matching media object, the tag comprising the media reference.

18. The method of claim 14, querying, by the media server, a time table of records when the media reference comprises a last played date and a last played time.

19. The method of claim 14, wherein the media reference comprises a hash.

20. The method of claim 14, wherein the device comprises a mobile communication device.

* * * * *